PEAK TIME DETECTING CIRCUIT

Filed Dec. 16, 1960

INVENTOR.
Robert H. Jenkins
BY
Carl V. Olson
ATTORNEY

United States Patent Office 3,048,717
Patented Aug. 7, 1962

3,048,717

PEAK TIME DETECTING CIRCUIT

Robert H. Jenkins, Camden, N.J., assignor to Radio Corporation of America, a corporation of Delaware Filed Dec. 16, 1960, Ser. No. 76,249
11 Claims. (Cl. 307—88.5)

This invention relates to peak time detecting circuits, and more particularly to circuits from which an output wave is derived which has an abrupt transition coinciding in time with the peak of an input wave. The timing of the output signal is substantially unaffected by variations in the amplitude of the input signal.

There are many applications requiring the detection of the time of occurrence of the maximum amplitude of an applied signal. The applications further may require the generation of pulses which are accurately related in time to the peaks of available input pulses. One example of such an application is in digital recording systems such as magnetic tape stations where digital information is recorded on magnetic tape. For example, the system timing is closely related to the signals read from the tape. However, the digital information read from the magnetic tape consists of pulses which vary in pulse width and pulse amplitude because of factors such as, tape skew, variations in head-to-tape spacing, and non-uniformities in the magnetic recording medium. The variations in the pulses preclude the possibility of generating accurately timed pulses by means of a simple threshold detecting and amplifying circuit, and as a consequence, relatively complex delay and comparison circuits have been employed by the prior art.

It is therefore a general object of this invention to provide an improved peak time detecting circuit.

Another object is to provide an improved circuit for generating an output signal having an abrupt transition that is accurately related to the peak of a rounded input pulse, even though the input pulse varies considerably in amplitude and shape.

It is another object to provide an improved peak time detector circuit which is simple and economical to construct, and which is compact and economical in its power requirements by virtue of employing transistors as the active elements.

In one aspect the invention comprises a transistor having emitter, base and collector electrodes biased for common base operation. An input signal is applied through a capacitor to the emitter electrode. The capacitor is chosen to have a low value of capacitance to provide a capacitive reactance, at the effective frequency of the input signal, that is sufficiently large relative to the emitter-base input impedance of the transistor so that a substantially differentiated version of the input signal appears at the emitter input terminal of the transistor. The differentiated signal includes a transition at a time corresponding with the peak of the input wave. The collector output electrode of the transistor is connected to the base input terminal of an emitter follower transistor having its collector connected to a point of reference potential. The emitter follower prevents the first transistor from saturating during portions of the differentiated signal which drive the transistor in the forward direction. The emitter follower transistor also provides a useful impedance transformation. A diode may be connected across the emitter-base terminals of the first transistor to limit voltage excursions in the reverse direction and thereby provide rapid recovery to the quiescent bias condition. A wave shaping circuit including a differentiator and threshold amplifier may follow the emitter follower transistor circuit.

These and other objects and aspects of the invention will be apparent to those skilled in the art from the following more detailed description taken in conjunction with the appended drawing, wherein.

Figures 1, 2, 3:
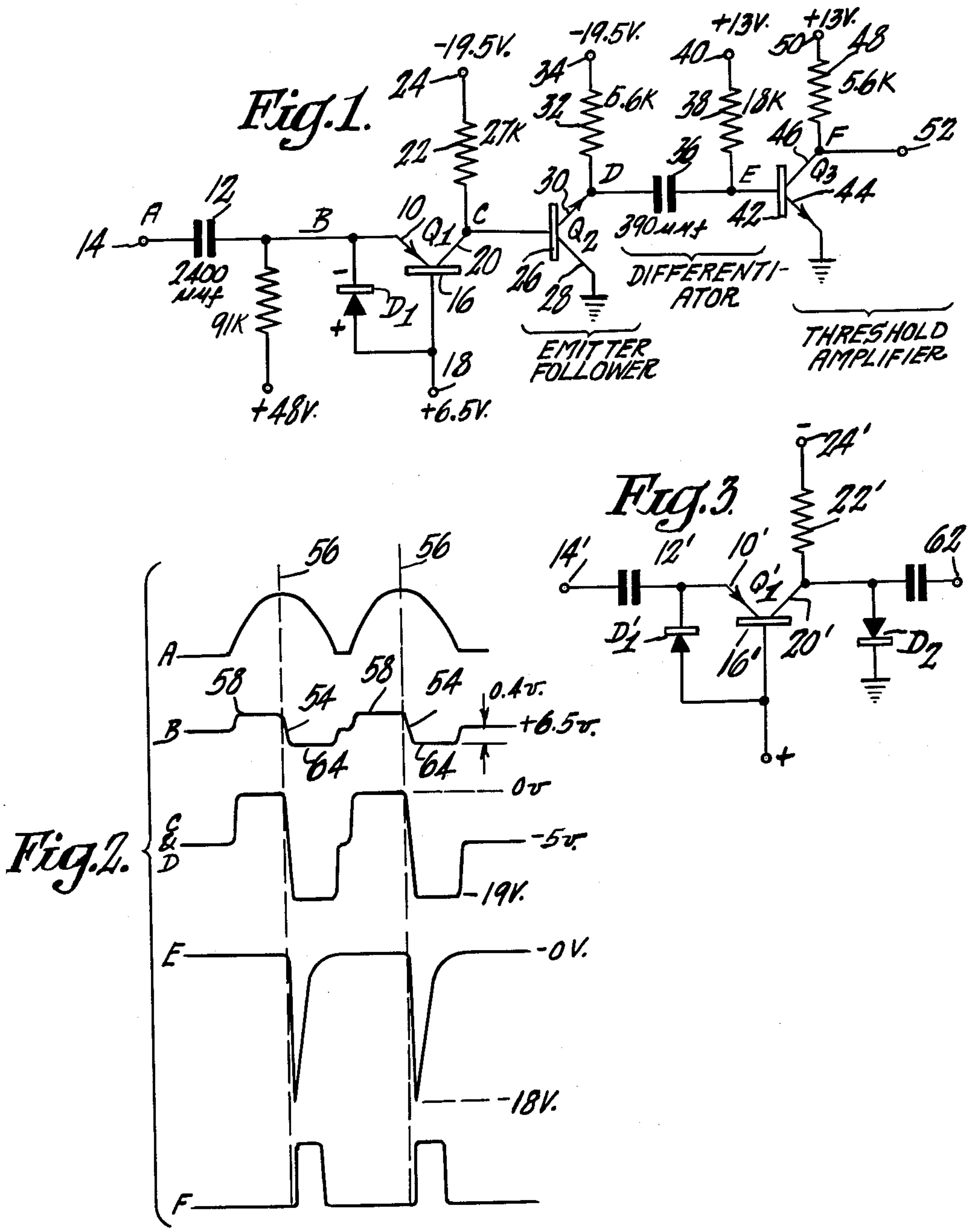
FIGURE 1 is a circuit diagram of a peak time detecting circuit constructed according to the teachings of the invention.
FIGURE 2 shows a series of voltage waveforms appearing at designated points in the circuit of FIGURE 1.
FIGURE 3 is a circuit diagram of another pulse time detecting circuit according to the invention.

The peak time detecting circuit of FIGURE 1 includes a first transistor such as the PNP transistor $Q_1$ connected in a common base circuit and having an emitter 10 electrode connected through a capacitor 12 to a signal input terminal 14. The transistor $Q_1$ has a base electrode 16 connected to the positive terminal 18 of a source (not shown) of unidirectional potential, and has a collector electrode 20 connected through an output resistor 22 to the negative terminal 24 of a source of unidirectional potential, as indicated. A diode $D_1$ is connected between the emitter 10 and base 16 of the transistor $Q_1$. The diode $D_1$ is poled in a direction to limit negative or reverse direction voltage excursions at the emitter electrode 10.

A second transistor of complementary type such as the NPN transistor $Q_2$ is connected as an emitter follower. Transistor $Q_2$ includes a base electrode 26 connected to the collector electrode 20 of transistor $Q_1$, a collector electrode 28 connected to a point of reference potential such as ground, and an emitter electrode 30 connected through an output resistor 32 to the negative terminal 34 of a source of unidirectional potential, as indicated.

The output emitter electrode 30 of transistor $Q_2$ is also connected to a differentiating circuit including a capacitor 36 and a resistor 38, one end of the resistor being connected to the positive terminal 40 of a source of unidirectional potential, as indicated. The output of the differentiator is connected to the base electrode 42 of a pulse generating transistor such as the NPN transistor $Q_3$ connected in a common emitter circuit as a threshold amplifier. The emitter 44 of transistor $Q_3$ is connected to a point of reference potential such as ground. The collector 46 is connected to an output resistor 48 to the positive terminal 50 of a source of unidirecional potential. The collector 46 is also connected to an output terminal 52.

Transistors of opposite conductivity from those illustrated can be used by suitably arranging the supply sources and poling the diodes.

The operation of the circuit of FIGURE 1 will be described with references to the voltage waveforms A through F of FIGURE 2 which appear at correspondingly designated points in the circuit of FIGURE 1. The input capacitor 12 in the circuit of FIGURE 1 is selected to have a small value of capacitance such that it presents a capacitive reactance at the operating frequency which is sufficiently large relative to the input impedance of the transistor $Q_1$ so that the capacitor 12 and the input impedance of the transistor $Q_1$ constitutes a differentiating circuit for the input signal. The value of the capacitor 12 should not be made so small that there is inadequate A.C. coupling of the input signal to the circuit.

The input impedance of the transistor $Q_1$ in the circuit of FIGURE 1 is about fifty ohms. The capacitive reactance of the capacitor 12 at the fundamental frequency of the input signal should be at least ten times as great as the input impedance of the transistor $Q_1$ to provide the desired differentiating action. It has been found that if the input signal has a fundamental frequency of 66 kilocycles, the capacitor 12 may have a value of 2400 $\mu\mu$f. to provide a capacitive reactance of about 2000 ohms at the designated frequency, or forty times the input impedance of the transistor $Q_1$. The value of 2400 $\mu\mu$f. for capacitor 12 provided very good differentiating action while providing fully adequate coupling of the input signal to the transistor $Q_1$.

When an input signal according to waveform A of FIGURE 2 is applied to the input terminal 14, a differentiated signal waveform B as shown in FIGURE 2 appears at the input emitter electrode 20 of transistor $Q_1$. It will be noted that the waveform B includes a sharp transition 54 at a time corresponding with the peak 56 of the input waveform A. A differentiated wave has an amplitude corresponding with the slope of the original wave. The slope of the original wave A changes from positive to negative at the time of the peaks 56. Consequently, the amplitude of the wave B changes from positive going to negative going at these times.

A differentiator requires a resistive impedance of small value compared with the capacitive reactance of the associated capacitor. The input impedance of a common base transistor, such as transistor $Q_1$, is relatively low, and is therefore vastly superior for the purposes of the invention to a transistor arranged for common emitter or common collector operation. The input impedance of the transistor $Q_1$ remains low provided that the transistor is not permitted to saturate.

The transistor $Q_1$ is prevented from saturating by the connection of its collector electrode 20 to the base input electrode 26 of the emitter follower transistor $Q_2$. The collector 28 of emitter follower transistor $Q_2$ is connected to a point of reference potential such as ground, so that whenever the voltage at the collector 20 of transistor $Q_1$ reaches ground potential, the transistor $Q_2$ becomes saturated (heavily conductive) and prevents the collector electrode 20 of transistor $Q_1$ from exceeding ground potential. When the collector 20 is clamped at ground potential, the emitter 10 is prevented from going more than a few tenths of a volt above the bias potential at the base electrode 16. Consequently, the positive half cycles of the differentiated wave B on the emitter 10 are limited at 58 to flat-topped pulses of very small amplitude. Were it not for the limiting effect of the emitter follower transistor $Q_2$, the positive going portions of the differentiated wave B would extend considerably above the clipped level shown. The emitter follower $Q_2$ thus performs a clamping function which prevents the transistor $Q_1$ from going into saturation and thereby presenting a relatively high impedance that would interfere with the differentiating action of the differentiator constituted by the capacitor 12 and the input impedance of transistor $Q_1$. The recovery time of transistor $Q_1$ is also improved by preventing saturation effects and thereby permitting higher frequency operation. In addition, the emitter follower $Q_2$ serves the useful function of providing an impedance transformation between the transistor $Q_1$ and the differentiator circuit 36, 38.

The diode $D_1$ is connected and poled to limit the negative going excursions of the differentiated wave B at emitter 10 to a fraction of a volt below the bias voltage on the base electrode 16. The negative going excursions are thus limited to the level designated 64 on wave B of FIGURE 2. The limiting action provided by diode $D_1$ is used to reduce the recovery time that would otherwise be needed between successive input pulses. On the other hand, if the circuit if FIGURE 1 is used with input pulses that are sufficiently widely spaced in time, the diode $D_1$ can be left out of the circuit.

The voltage waveform C and D appearing at the output collector 20 of transistor $Q_1$ and at the output emitter 30 of transistor $Q_2$ is an amplified version of the differentiated and limited signal waveform B appearing at the input emitter 10 of transistor $Q_1$. The emitter follower transistor $Q_2$ does not provide voltage amplification, but it does provide an impedance transformation so that it can supply a larger current to the differentiator 36, 38 and threshold amplifier $Q_3$.

The voltage waveform E appearing at the output of the differentiator 36, 38 includes only negative excursions because the positive excursions are prevented or clipped by the clamping action of the base-emitter junction of the transistor $Q_3$. This clipping action results because the emitter 44 of transistor $Q_3$ is directly connected to ground. Transistor $Q_3$ is biased to be normally fully conductive, and consequently, the base electrode 42 cannot rise more than a fraction of a volt above ground potential. The negative excursions of the differentiated wave E applied to the base electrode 42 of transistor $Q_3$ cause the transistor $Q_3$ to be rendered nonconductive during intervals when the input signal exceeds a predetermined negative threshold value. As a result, the output pulse waveform F is produced at the output terminal 52. The generated output wave F consists of positive pulses having sharp leading edges accurately related in time to the peak times 56 of the input wave A. In practice it has been found that the leading edges of the output wave F lag the peak times 56 of input wave A by a very short period of time.

Solely by way of illustration, in a peak time detecting circuit constructed according to FIGURE 1 and having values of circuit elements shown on FIGURE 1, and having a Type 2N643 transistor $Q_1$, a Type 2N585 transistor $Q_2$, and a Type 2N585 transistor $Q_3$, and having an input signal consisting of rounded pulses with a nominal maximum pulse repetition rate of about 66 kilocycles, it was found that the leading edge of the output pulses lagged the peaks of the input pulses by about 0.5 microsecond, and that the lag varied only a few tenths of the microsecond from this value due to a ten-to-one change in the amplitude of the input pulses. The output pulses were 1.5 microseconds in duration. The input pulses represented binary "1" bits recorded on the magnetic tape. The circuit of FIGURE 1 does not require an input signal of regularly recurring pulses, but it is operative to provide an accurately timed output pulse even for randomly applied input pulses.

FIGURE 3 shows a modified peak time detecting circuit which is similar to the circuit of transistor $Q_1$ in the system of FIGURE 1. In the circuit of FIGURE 3, circuit elements which correspond to those of FIGURE 1 are given the same numeral with a prime designation added. The emitter follower in FIGURE 1 is replaced in the circuit of FIGURE 3 by a diode $D_2$ which is connected from the collector 20' of transistor $Q_1'$ to ground. The diode $D_2$ performs the function of preventing the differentiated voltage at the emitter 10' from exceeding a fraction of a volt above the bias voltage on the base electrode 16'. The diode $D_2$ therefore prevents the transistor $Q_1'$ from saturating, and thus prevents the input impedance of the transistor $Q_1'$ from increasing to the point where the necessary differentiating action is impaired. The output signal available at the output terminal 62 is a signal having a sharp transition corresponding in time with the peak of the input wave. This output signal may be applied to wave shaping circuits, if desired, for the purpose of translating the wave to one having a more useful form.

What is claimed is:

1. A peak time detecting circuit comprising a first transistor having emitter, base and collector electrodes biased for common base operation, means including a capacitor for applying an input wave to said emitter, said capacitor being chosen to provide a capacitive reactance which is sufficiently large in relation to the input impedance of the transistor to constitute therewith a differentiating circuit for the input wave, and means coupled to said collector to amplify the output of said transistor and provide an output signal having a sharp transition corresponding in time to the peak of the input signal.

2. A peak time detecting circuit comprising a first transistor having emitter, base and collector electrodes biased for common base operation, means including a capacitor for applying an input wave to said emitter, said capacitor being chosen to provide a capacitive reactance which is at least ten times as great as the input impedance of the transistor to constitute therewith a differentiating circuit for the input wave, a rectifying device connected to the collector of said transistor to prevent said transistor from saturating when the differentiated input signal voltage increases in the forward direction, and means to amplify the output of said transistor to provide an output signal having a sharp transition corresponding in time to the peak of the input wave.

3. A peak time detecting circuit comprising a first transistor having emitter, base and collector electrodes biased for common base operation, means including a capacitor for applying an input wave to said emitter, said capacitor being chosen to provide a capacitive reactance which is sufficiently large in relation to the input impedance of the transistor to constitute therewith a differentiating circuit for the input wave, a second transistor having emitter, base and collector electrodes biased for emitter follower operation, a connection from the collector of said first transistor and the base of said second transistor, and a connection from the collector electrode of said second transistor to a point of reference potential, whereby the base-collector junction of said second transistor prevents said first transistor from saturating when the differentiated input signal voltage increases in the forward direction.

4. A detecting circuit as defined in claim 3 and in addition a diode connected between the emitter and base of the first transistor to limit emitter voltage excursions in the reverse direction.

5. A peak time detecting circuit comprising a first transistor having emitter, base and collector electrodes biased for common base operation, means including a capacitor for applying an input wave to said emitter, said capacitor being chosen to provide a capacitive reactance which is sufficiently large in relation to the input impedance of the transistor to constitute therewith a differentiating circuit for the input wave, a second transistor having emitter, base and collector electrodes biased for emitter follower operation, a connection from the collector of said first transistor and the base of said second transistor, a connection from the collector electrode of said second transistor to a point of reference potential, whereby the base-collector junction of said second transistor prevents said first transistor from saturating when the differentiated input signal voltage increases in the forward direction, a differentiator circuit coupled to the emitter of said second transistor, and a threshold amplifier coupled to the output of said differentiator circuit to provide an output pulse having a leading edge related in time to the peak of said input wave.

6. A peak time detecting circuit comprising a first transistor having emitter, base and collector electrodes biased for common base operation, means including a capacitor for applying an input wave to said emitter, said capacitor being selected to provide a capacitive reactance which is sufficiently large in relation to the input impedance of the transistor to constitute therewith a differentiating circuit for the input wave, a second transistor having emitter, base and collector electrodes biased for emitter follower operation, a connection from the collector of said first transistor and the base of said second transistor, a connection from the collector electrode of said second transistor to a point of reference potential, whereby the base-collector junction of said second transistor prevents said first transistor from saturating when the differentiated input signal voltage increases in the forward direction, a diode connected between the emitter and base of the first transistor to limit emitter voltage excursions in the reverse direction, a differentiator circuit coupled to the emitter of said second transistor, and a threshold amplifier coupled to the output of said differentiator circuit to provide an output pulse having a leading edge coinciding in time with the peak of said input wave.

7. A peak time detecting circuit comprising a first transistor having input, common and output electrodes, means including a capacitor for applying an input wave to said input electrode, said capacitor providing a capacitive reactance which is sufficiently large in relation to the input impedance of said transistor to constitute therewith a differentiating circuit for the input wave, a second transistor having input, common and output electrodes, means coupling the output electrode of the first transistor to the input electrode of the second transistor, means to bias said second transistor so that said second transistor prevents said first transistor from saturating when the differentiated input signal voltage increases in the forward direction, and means to amplify the output of said second transistor to provide an output signal having a sharp transition corresponding in time to the peak of the input wave.

8. A peak time detecting circuit comprising a transistor having input, common and output electrodes, means including a capacitor for applying an input wave to said input electrode, said capacitor providing a capacitive reactance which is sufficiently large in relation to the input impedance of said transistor to constitute therewith a differentiating circuit for the input wave, a rectifying device connected to the output electrode of said transistor to prevent said transistor from saturating when the differentiated input signal voltage increases in the forward direction, a second rectifying device connected between the input and common electrodes of the transistor to limit input voltages excursions in the reverse directions, and means to amplify the output of said transistor to provide an output signal having a sharp transition corresponding in time to the peak of the input wave.

9. A peak time detecting circuit comprising a first transistor having input, common and output electrodes, means including a capacitor for applying an input wave to said input electrode, said capacitor being selected to provide a capacitive reactance which is sufficiently large in relation to the input impedance of said transistor to constitute therewith a differentiating circuit for the input wave, a second transistor having input, common and output electrodes, means coupling the output electrode of the first transistor to the input electrode of the second transistor, means to bias said transistors so that said second transistor prevents said first transistor from saturating when the differentiated input signal voltage increases in the forward direction, a diode connected between the input and common electrodes of the first transistor to limit input voltage excursions in the reverse directions, and means to amplify the output of said second transistor to provide an output signal having a sharp transition corresponding in time to the peak of the input wave.

10. A peak time detecting circuit comprising a first transistor having input, common and output electrodes, means including a capacitor for applying an input wave to said input electrode, said capacitor providing a capacitive reactance which is sufficiently large in relation to the input impedance of said transistor to constitute therewith a differentiating circuit for the input wave, a second transistor having input, common and output electrodes, means coupling the output electrode of the first transistor to the input electrode of the second transistor, means to bias said transistors so that said second transistor prevents said first transistor from saturating when the differentiated input signal voltage increases in the forward direction, a diode connected between the input and common electrodes of the first transistor to limit input voltage excursions in the reverse directions, a differentiator circuit coupled to the emitter of said second transistor, and a threshold amplifier coupled to the output of said differentiator circuit, whereby said threshold amplifier provides an output pulse having a leading edge coinciding in time with the peak of said input wave.

11. A peak time detecting circuit comprising a first transistor having emitter, base and collector electrodes biased for common base operation, means including a coupling capacitor for applying an input wave to said emitter, whereby said coupling capacitor and the input impedance of said first transistor constitutes a differentiating circuit so that the wave applied to the emitter is a differentiated version of the input wave, a second transistor having emitter, base and collector electrodes biased for emitter follower operation, a connection from the collector of said first transistor and the base of said second transistor, a connection from the collector electrode of said second transistor to a point of reference potential, whereby the base-collector junction of said second transistor prevents said first transistor from saturating when the input signal voltage increases in the forward direction, a diode connected between the emitter and base of the first transistor to limit emitter voltage excursions in the reverse direction, a differentiator circuit coupled to the emitter of said second transistor, and a threshold amplifier coupled to the output of said differentiator circuit, whereby said threshold amplifier provides an output pulse having a leading edge coinciding in time with the peak of said input wave.

References Cited in the file of this patent

UNITED STATES PATENTS

| | | |
|---|---|---|
| 2,448,718 | Koulecovith | Sept. 7, 1948 |
| 2,759,052 | MacDonald et al. | Aug. 14, 1956 |
| 2,975,367 | Adams et al. | Mar. 14, 1961 |